PROCESS OF PRODUCING A CONTROLLABLE RISE IN VISCOSITY OF AN UNCURED POLYESTER RESIN COMPOUND AND COMPOSITION THEREFROM

Filed July 30, 1969 6 Sheets-Sheet 1

INVENTOR.
ERVIN J. WILLIGER
BY
[signature]
ATTORNEY

INVENTOR.
ERVIN J. WILLIGER
BY John J. Murphy
ATTORNEY

Oct. 27, 1970 E. J. WILLIGER 3,536,642

PROCESS OF PRODUCING A CONTROLLABLE RISE IN VISCOSITY
OF AN UNCURED POLYESTER RESIN COMPOUND
AND COMPOSITION THEREFROM

Filed July 30, 1969 6 Sheets-Sheet 3

INVENTOR.
ERVIN J. WILLIGER

BY [signature]
ATTORNEY

INVENTOR.
ERVIN J. WILLIGER
BY
John J. Murphy
ATTORNEY

INVENTOR.
ERVIN J. WILLIGER
BY [signature]
ATTORNEY

INVENTOR.
ERVIN J. WILLIGER
BY
[signature]
ATTORNEY 3,536,642

PROCESS OF PRODUCING A CONTROLLABLE RISE IN VISCOSITY OF AN UNCURED POLYESTER RESIN COMPOUND AND COMPOSITION THEREFROM

Ervin J. Williger, Tallmadge, Ohio, assignor to The General Tire & Rubber Company, a corporation of Ohio Continuation-in-part of application Ser. No. 810,554, Mar. 26, 1969. This application July 30, 1969, Ser. No. 859,226
Int. Cl. C08g *17/10, 17/14*
U.S. Cl. 260—22 12 Claims

ABSTRACT OF THE DISCLOSURE

This invention concerns methods of producing a controllable increase in viscosity of an uncured polester resin compound; one method comprises the step of adding to the uncured compound a metal salt of an organic acid wherein the metal is selected from the group consisting of aluminum and gallium; another comprises the step of adding to the uncured polyester compound a metal salt of an organic acid wherein the metal is selected from the group consisting of aluminum and gallium, and a hydroxyl containing agent; and a composition comprising an uncured polyester resin compound and a metal salt of an organic acid that possesses a long shelf life.

BACKGROUND OF THE INVENTION

Field of the invention

This invention relates to the field of thermosetting plastics. More particularly, this invention relates to the field of polyester resin thermosetting plastics and to methods of producing a controllable increase in viscosity of uncured compounds thereof.

Description of the prior art

This application is a continuation-in-part of application Ser. No. 810,554, filed Mar. 26, 1969, now abandoned.

Plastics are widely acceptaed as construction materials. Fiber reinforced plastics are, in fact, being substituted for wood, metal, and concrete in many applications. One type of plastic, fiber reinforced polyester resin, has become popular in such varied areas as household appliance housings, office furniture, automobile fender extensions, rifle stocks, and rocket casings.

Fiber reinforced thermosetting resins were originally molded by placing a dry mat of fibers, pre-formed to the shape of the mold, into a mold; pouring a pre-calculated quantity of liquid polyester resin, containing associated fillers, catalysts, etc., over the fiber "pre-form"; then closing and heating the mold to cure (crosslink) the resin. This method was rife with difficulties; the resin thinned out, during preliminary mold heat up, and sank through the pre-form to low spots in the mold. Moreover, the amount of resin poured onto the pre-form varied with each mold operator. These problems, plus the costly manpower involved, led to development of the bulk molding compound or BMC.

In a BMC the polyester resin, fillers, and fibers are all premixed and extruded into slugs. A slug is placed in the mold, the mold closed and heat applied to cure the resin. This method of compounding eliminates many of the problems of the original method, however, it, too, has become unpopular because many of the fragile reinforcing fibers are broken under the high shear created during mixing of the compound causing a noticeable deterioration in the physical properties of the molded item. This situation has led to development of the sheet molding compound or SMC.

In an SMC the resin and other ingredients are mixed without the fibers and then applied or impregnated into both sides of a thin (about 1/16 inch thick) dry fiber mat. A combination of capillary action and absorption operates to produce a thin sheet of fibers homogeneously impregnated with resin compound where each fiber is embedded, fully wetted, in the compound. Several sheets of SMC are stacked together and cut or stamped to the general shape of the item to be molded though quite reduced in area. The stack is placed in the mold, the mold closed, and the resin cured in the conventional manner. Not only does this method allow the reinforcing fibers to remain whole, but it is amenable to fully automatic processing, i.e., automatic mixing and sheeting automatic stacking and stamping, and automatic mold loading.

One of the problems in this process has been the difficulty in handling the SMC. The resin impregnated fiber mat is sticky, making cutting and handling quite difficult. The prior art has sought to eliminate this problem by adding chemicals to the SMC that bring about an increase in viscosity of the resin after it has been impregnated into the fiber mat. Thereafter, the SMC or resin impregnated mat is non-sticky and easily handleable. In practice the resin impregnated mat is covered on both sides with thin sheets of material such as plastic, rolled up, and set aside for later use. During this period the resin completes wetting of the fibers and increases in viscosity. Upon unrolling the mat and stripping away the cover sheets, the nonsticky pliable SMC is ready to be stacked, cut, and loaded into the mold as described earlier. These viscosity raising chemicals have an additional advantage in that the increased viscosity maintains the integrity of the SMC constituents throughout the crosslinking phase of the molding cycle, i.e., the increased viscosity prevents the resin from separating from the other compound constituents when it thins out during preliminary mold heat-up.

These prior art methods use such chemicals as magnesium oide (U.S. 2,628,209) and calcium oxide (S.N. 754,954, "Process for Increasing Viscosity of Uncured Polyester Resins" owned by the assignee of this application). They possess, however, a disadvantage in that either the viscosity takes such a long time, e.g., 2–6 days to rise that SMC inventories are overburdened or the viscosity once it begins to rise continues rapidly, e.g., in a few days, to where the SMC is too stiff to mold.

Where these viscosity raising chemicals are used at low levels, the time required to obtain a viscosity rise is a matter of days presenting severe difficulties in production planning. In contrast, if the amount of chemicals is increased to obtain a faster viscosity rise, the viscosity increases too fast to allow total wetting of the fibers and the viscosity continues to increase until the SMC is too stiff to mold in the largest of presses. As the SMC becomes stiffer, the mold operator must increase the pressure on the press continually to compensate for the rising viscosity of the compound. This requires the utilization of maintenance personnel—a factor of increasing cost and interruption to manufacturing schedules. Moreover, the proper combination of mold closure pressure, mold temperature, holding time, and holding pressure is never fully achieved because the continually increasing viscosity of the polyester compound prevents steady-state molding conditions from ever being reached. After the SMC becomes too stiff, it must be scrapped as this viscosity rising phenomenon is irreversible.

The basis of this invention is that the addition of metal salts of organic acids, wherein the metal is selected from the group consisting of aluminum and gallium, with or without hydroxyl containing agents, surprisingly produces a desirable balance between the time required for the necessary increase in viscosity and the long term viscosity of the SMC. The result of this invention is an uncured polyester resin compound that requires a reasonable time to achieve a rise in viscosity, that permits total wetting of the fibers, and that maintains a relatively constant viscosity over an extremely long period of time.

Therefore, the primary object of this invention is methods of producing a controllable rise in viscosity of an uncured polyester resin compound. Other objects are methods of controlling the maturation time and consistency level of uncured polyester resin compounds; and uncured polyester resin compounds having long shelf lives that are amenable to fully automated molding processes.

SUMMARY OF THE INVENTION

This invention concerns a method of producing a controllable rise in viscosity of an uncured polyester resin compound which comprises the step of introducing into the uncured polyester compound a metal salt of an organic acid wherein the metal is selected from the group consisting of aluminum and gallium. An alternative method is to introduce into the uncured polyester compound a metal salt of an organic acid wherein the metal is selected from the group consisting of aluminum and gallium, and a hydroxyl containing agent.

BRIEF DESCRIPTIONS OF THE DRAWINGS

DESCRIPTION OF THE PREFERRED EMBODIMENTS

Figure 1:
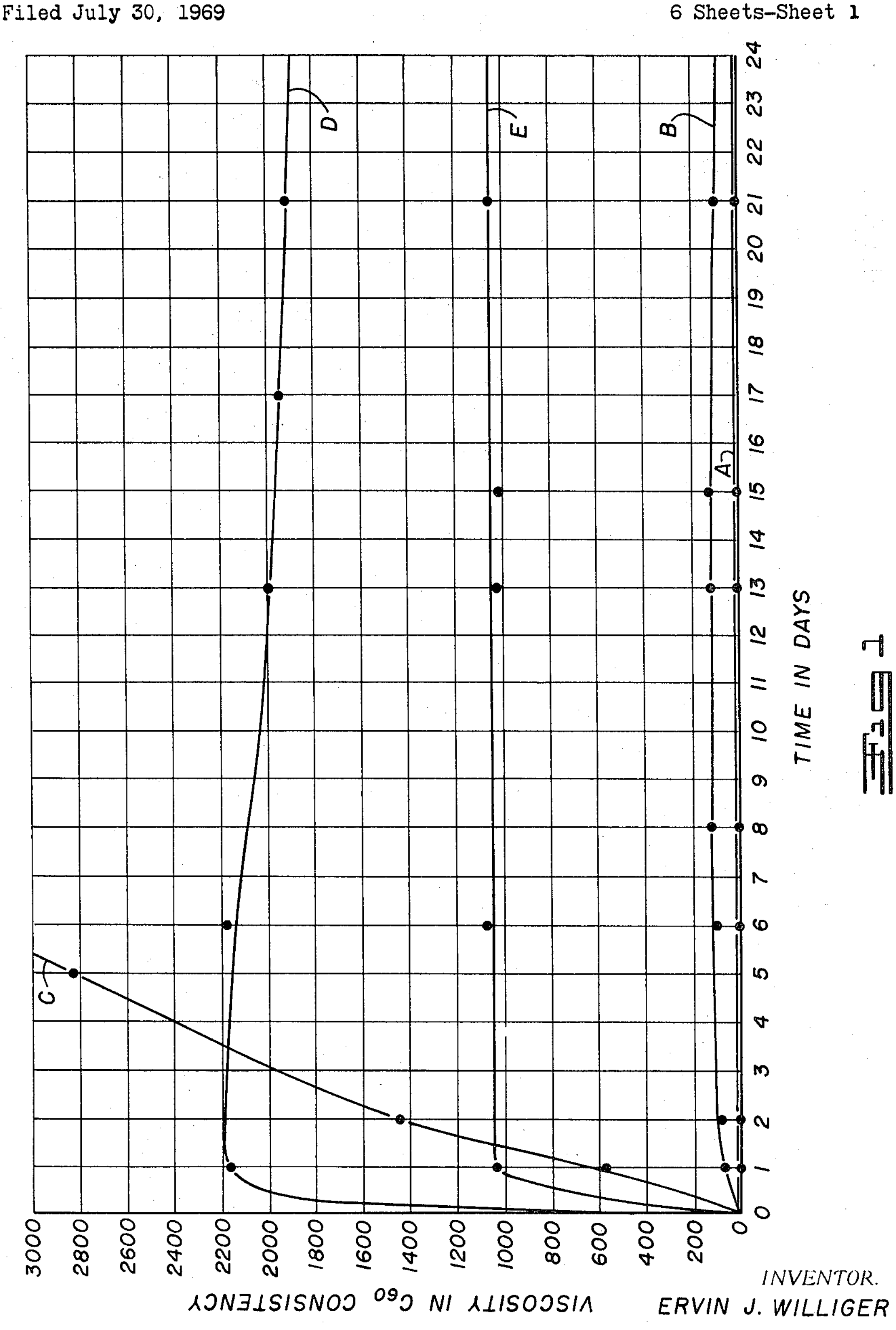
FIG. 1 is a graph of viscosity vs. time for some polyester resins compounded according to prior art practices and some resins incorporating an embodiment of this invention.

The term "viscosity" has been partially replaced by the term "consistency" in dealing with these viscosity raising methods. This is because of the difficulty in determining the viscosity of the thickened compounds and the lack of necessity for doing so. What is really needed is merely a way to express the general thickness or stiffness of the compound.

Such a method has been developed; it is based upon modification of existing equipment used in the asphalt industry. A container of uncured polyester compound (without fiber reinforcement) is placed under a flat-bottomed, vertically-positioned, slideably-mounted ⅜ inch diameter smooth finished plunger. At the top of the plunger is a platform for holding various weights. The plunger is pressed into the compound to a depth of about ¼ inch. Weights are placed on the plunger's platform sufficient to force the plunger an additional one inch (determined by marks on the shaft above the penetration area) into the compound in *less* than one minute (60 seconds). The plunger is then withdrawn from the compound, cleaned, and reinserted again (at a new location) ¼ inch into the compound. Some of the weights are removed so that the plunger will penetrate the additional one inch in *more* than one minute. A straight-line graph is made of penetration time vs. penetration weight, using the two points taken from the experiments, and the weight required to cause a one minute penetration of one inch determined. This value, in grams, is termed the "consistency" or "$C_{60}$" of the compound. Thus, a compound may be termed a 500 gram consistency, having a $C_{60}$ of 800 grams, etc.

Broadly, this invention concerns the surprising discovery that metal salts of organic acids wherein the metal is selected from aluminum and gallium, either alone or in combination with hydroxyl containing agents, introduced into the uncured polyester compound produces a controllable viscosity rise within a reasonable time and a compound that maintains a relatively constant viscosity over an extremely long period of time. This constant or equilibrium viscosity is termed "maturation" in trade parlance.

Although not fully understood, it is thought that the metal ions are placed in a state of increased activation by the organic acid to which they are attached and that these metal ions react with carboxyl groups in the polyester resin to form some sort of chain-extended structure. The addition of hydroxyl groups, from the added hydroxyl containing agent, evidently modifies this reaction.

The polyester resins usable in this invention are unsaturated polyesters that are formed by the esterification of unsaturated polycarboxylic acids and glycols. These polyesters are also known in the art as alkyd (from ALcohol and aCID esters and alkyd resins. Examples of polyester resins usable herein include the reaction products of polybasic acids and anhydrides, for example, phthalic anhydride, isophthalic acid, tetrahydrophthalic anhydride, hexahydrophthalic anhydride, maleic anhydride, fumaric acid, chloromaleic acid and itaconic acid with glycols such as ethylene, propylene, and butylene glycols, diethylene glycol, triethylene glycol, and glycerol. A minor portion of the unsaturated polycarboxylic acid may be replaced with a saturated polycarboxylic acid to affect physical properties, such as to increase the flexibility of the cured polyester.

Into the unsaturated polyester is blended at least one polymerizable monomer containing a terminal $>C=CH_2$ group which is preferably attached to an electronegative group such as the phenyl group as in styrene, the halogen ion as in vinyl chloride, the acetoxy group as in vinyl acetate, and the carbethoxy group as in ethyl acrylate. Further examples of polymerizable monomers usable herein are triallyl cyanurate, divinyl benzene, diallyl phthalate, vinylidene chloride, and vinyl benzoate. These components copolymerize upon introduction of a free radical generating catalyst such as ketone peroxides (methyl ethyl cyclohexanone peroxide, methyl isobutyl ketone peroxide), diacyl peroxides (lauroyl peroxide, benzoyl peroxide, parachloro benzoyl peroxide, and azo compounds (abzobisisobutyrlnitrile). During copolymerization (curing), the unbroken double bonds carried over from the polycarboxylic acid into the resin are opened up by the free radical catalyst and cross-connected through monomer linkages; the final curing reaction is classed as addition polymerization because no by-products are formed. During compounding, other materials are added such as fillers (calcium carbonate), pigments (titanium dioxide), lubricants (stearic acid), polymerization inhibitors (catechols), and others.

Polyester resins are characterized by an acid number which corresponds to the amount of carboxyl groups present in the resin. Although polyester resins are made in a wide range of acid numbers, e.g., from 0 to 100 and higher, those most suitable for sheet molding compounds are generally below about 35. Because this invention is based upon the apparent reaction of metal ions with the carboxyl groups in the resin, a polyester resin of zero or near-zero acid number is not suitable for use herein. Therefore, for this invention the polyester resins best suitable are those having acid numbers above zero and below about 35.

The organic acids, to which the metal, for example, aluminum, may be reacted appear to be unlimited in number of carbon atoms and molecular structure; many have been tested and all found to show different degrees of effectiveness. From a practical viewpoint, however, the range of organic acids is more limited. This is because the amount of metal per mole of metal salt decreases with increasing size of organic acid molecule thus requiring more total metal salt for a set amount of metal. Moreover, as the size of the organic acid molecule increases, the amount of metal salt required per part metal becomes an item of increased cost. Furthermore, the larger the metal salt molecule, the more the molecule interferes in the composition to deteriorate physical properties; this is known as the "soap" effect in trade parlance. These pragmatic aspects of the invention limit the usefulness of the metal compounds to those containing less than about 30 carbon atoms in the acid molecule.

These carbon atoms may be arranged in aliphatic, aromatic, or heterocyclic configurations. As shown in the examples that follow, different molecular configurations of organic acid, e.g., aluminum naphthenate and aluminum stearate, have about equal effect on the maturation of the polyester compound.

Because aluminum and gallium are trivalent, the metal salt may take any one of the following three structural forms:

$$(X)_2M—OOR;\ XM—(OOR)_2;\ \text{or},\ M—(OOR)_3$$

where X represents a group of unitary negative charge such as a hydroxyl group or a halide ion, M represents a trivalent metal atom, and —OOR represents an organic acid group of unitary negative charge occuring from organic acids such as caproic acid ($C_6H_{12}O_2$), lauric acid ($C_{12}H_{24}O_2$), and nonadecylic acid ($C_{19}H_{38}O_2$).

Commercial forms of metal salts of organic acids are mixtures of the mono-, di-, and tri-salts and are generally characterized as to their assayed metal percentage. No difference was found in tests between the mono-, di-, or tri-salts of a particular compound. Preferred among all the metal salts are those of aluminum salts of octoic (or ethyl hexoic) acid (aluminum octoate), aluminum salts of lauric acid (aluminum laureate), and gallium salts of octoic (or ethyl hexoic) acid (gallium octoate). These three salts demonstrated the greatest influence on polyester resin compound maturation.

The metal salts are introduced into the uncured polyester resin compound the same as any other dry material, i.e., they are sprinkled into the mixture as it is mixed. They may be introduced as the first additive to the resin, introduced during the compounding stage, or introduced after the compound is impregnated into fibers. It is preferred, however, to introduce the metal salt into the polyester compounding during the mixing stage wherein the polymerizable monomer or monomers, catalysts, lubricants, and other materials are added. The metal salt may be in the form of a powder, a liquid, or a meltable solid. Generally speaking, metal salts as powders or liquids are easily blended into the resin compound along with the other added materials. The metal salt may also be in the form of chunks or granules; however, these forms of the material are more difficult to mix into the resin. Virtually any sort of mixer can be used in incorporating the metal salt into the polyester compound. Many such mixers are known in the art such as paddle wheel mixers, low shear blenders, and masticators. These compounds may thereafter be impregnated into fibers as is well-known in the art.

As is well-known in the plastics art, each additive to uncured resins affects either the processability of the resin or the final product or both. On the subject of lubricants, it has been found that the commonly known lubricants affect the maturation level of a polyester compound containing the inventive metal salts or metal salts and hydroxyl containing agent. This merely demonstrates that a slight amount of trial and error experimenting must be accomplished with different resin formulations to establish the desired amount of constituents and to maximize the affects of this invention.

Polyester resin compounds containing these metal salts or metal salts and hydroxyl containing agents possess the unique feature of requiring less mold pressure to form than compounds prepared under prior art methods. What this means is that resin stickiness may be effectively offset by increasing the compound's consistency, yet the compound is extremely pliable at this increased consistency and requires less molding pressure. This feature permits more versatility in compounding and in molding; compounds may now be prepared at higher filler and fiber levels and smaller presses may be used to mold parts from these compounds.

The surprising discovery that these metal salts of organic acids produce the controllable viscosity rise is made even more surprising by the fact that this synergistic action does not occur with other metal salts of the same organic acids. As will be shown in the examples, organic acid salts of magnesium, zinc, and calcium do not produce the same effect as do aluminum salts. As the examples show, zinc and cobalt salts produce a slight effect on viscosity but nowhere near a usable degree and certainly not nearly the effect of the aluminum and gallium compounds.

Although the operation of the metal salt in the polyester resin compound (in raising the viscosity) is not fully understood, it is theorized, as described before, that the metal ions react with the carboxyl groups of the polyester resins. Whether this is true or not, it has been found desirable to base the amount of metal salt addition on the number of equivalents of carboxyl groups in the polyester resin. This is directly calculable from knowledge of the resin's acid number and the molecular weight of the metal salt. Operable ranges of metal salts and hydroxyl containing agents vary with each resin. As an example of an operable range, for aluminum octoate and water in a resin of acid number 20, the range is between 0.1 to 1.0 moles but preferably 0.2 to 0.7 moles aluminum octoate per carboxyl equivalent of the resin and 0.1 to 6.0 moles but preferably 0.5 to 1.5 moles water per mole aluminum in the aluminum salt. In all cases, i.e., with all metal salts, the minimum amount of metal required to produce a noticeable rise in viscosity was about 0.05 mole metal per carboxyl equivalent in the polyester resin.

In calculating the amount of aluminum salt, say aluminum octoate (8% Al), one proceeds as follows:

Polyester resin acid No.=24
Aluminum octoate=8% aluminum
Atomic weight aluminum=27
KOH molecular weight=56.1

The acid number[1] of the polyester resin is divided by the millimolecular (milliequivalent) weight of potassium hydroxide (KOH) to obtain the number of carboxyl (—COOH)

equivalents per gram resin:

(a)

$$\frac{24\text{ mgm. KOH/gm. resin}}{56100\text{ mgm. KOH/KOH eq.}}=.000267\ \frac{\text{KOH eq.}}{\text{gm. resin}}$$

$$=.000267\ \frac{-\text{COOH eq.}}{\text{gm. resin}}$$

The amount of —COOH equivalents per gram resin, determined in Equation (a), is multiplied by 100 to place the

[1] The acid number of a polyester resin is the number of milligrams of KOH necessary to tritrate one gram of the resin to a neutral end point; this is directly proportional to the number of carboxyl groups (equivalents) in the resin.

basis of succeeding calculations at 100 parts or 100 grams resin:

(b)

$$.000267\ \frac{-\text{COOH eq.}}{\text{gm. resin}} \times 100\ \text{gm. resin} = .0267\ -\text{COOH eq.}$$

For an aluminum addition equal to ½ mole aluminum per carboxyl (—COOH) equivalent:

(c)

$$0.5\ \frac{\text{mole alum.}}{-\text{COOH eq.}} \times .0267\ -\text{COOHeq .} = .01335\ \text{mole alum.}$$

$$.01335\ \text{mole alum.} \times 27\ \frac{\text{gm. alum.}}{\text{mole alum.}} = 0.361\ \text{gm. alum.}$$

$$0.361\ \text{gm. alum.} \div 0.08\ \frac{\text{gm. alum.}}{\text{gm. alum. octoate}} = 4.5\ \text{gm. alum. octoate}$$

Therefore, for the addition of ½ mole aluminum octoate (8% aluminum) per carboxyl equivalent to an uncured polyester resin of acid number 24, one would add 4.5 grams (parts) aluminum octoate per 100 grams (parts) resin.

An alternate process of producing the controllable viscosity rise, in the uncured polyester resin described above, is to add a hydroxyl containing agent to the resin along with the metal salt. Although not fully understood, it appears that the hydroxyl groups, in the hydroxyl containing agents, modify the reaction of the metal ions with the polyester resin carboxyl groups. This alternate process permits additional control of the maturation (consistency level, i.e., for a given metal salt addition, the long term consistency is controllable on the basis of the amount of hydroxyl containing agent added. In addition, the hydroxyl containing agent decreases the viscosity rise initiation time, i.e., the compound becomes stiffer sooner.

Hydroxyl containing agents found effective in this invention are those wherein the hydroxyl group is attached to atoms taken from the group consisting of hydrogen and carbon, an example of the former being water. Examples of the latter configuration and useful herein include the primary, secondary, and tertiary alcohols (monoalkyl, dialkyl, and trialkyl carbinols) such as propanol-1, propanol-2, methyl propanol-2, propandiol-1:2, and pro-pandiol-1:3. Other examples included the glycols such as ethylene glycol, diethylene glycol, triethylene glycol, and glycerol.

The hydroxyl containing agent may be added to the uncured polyester compound at any stage of compounding; the principal requirement is to insure that it is homogeneously blended throughout the compound for maximum effectiveness. It may be added prior to the introduction of the metal salt, along with the metal salt, or subsequent thereto; in all cases its effectiveness on raising the viscosity of the compound is the same.

The hydroxyl containing agent may be used in virtually any amount from trace quantities and greater. As the examples emphatically demonstrate, the hydroxyl containing agent is effective in all ranges from trace quantities and higher. For example, in one particular resin system, water is effective in quantities from a trace up to six moles per mole aluminum and extrapolation of the date show higher amounts also to be effective; however, the preferred range of water addition in this particular system is from about ½ to 1½ moles water per mole aluminum. In examples that follow, the effectiveness of other hydroxyl containing agents are demonstrated. One of the unique aspects of this process using hydroxyl containing agents is that a fully automatic polyester resin (SMC) compounding line could be constructed wherein a constant amount of metal salt is blended into the resin and lower consistencies obtained when desired solely by adding small amounts of hydroxyl containing agent to the compound during blending. Such an automatic process would eliminate some existing process steps, e.g., calculating and weighing the chemicals, improve compound batch-to-batch uniformity, and increase percent compound output rates.

The following examples are given to show the uniqueness of this invention over prior art methods, the range of metal salts and the range of hydroxyl containing agents usable herein, the efficacy and versatility of the processes, and the uniqueness of the uncured polyester compound containing the novel controllable viscosity-rising chemicals. These examples are provided to show one skilled in the art how to practice the invention and are not to be construed either singly or in combination as placing a limitation thereon.

In these examples the polyester resin compounds are characterized as to viscosity or consistency, whichever is measurable. Viscosity measurements (on a Brookfield viscometer) are practical up to about 500,000 centipoises; above this, the consistency is measured via the device described earlier. Below about 500,000 centipoises, consistency measurements are quite erratic so that the Brookfield viscometer provides the most reliable data; however, the Brookfield viscometer cannot reliably measure viscosities above about 500,000 centipoises. A relationship has not yet been established between viscosity and consistency; however, they both indicate the degree of "stiffness" of the compounds.

Although this invention is directed to the SMC art, it is equally applicable to the BMC art and has been successfully utilized therein.

EXAMPLE 1

Five (uncured) polyester resin sheet molding compounds were made according to Formulas A, B, C, D, and E below; the ingredients in each were blended in the order shown. All quantities hereinafter are parts per hundred parts resin except for the inhibitor which is in parts per million resin and other quantities where marked. The compounds were not impregnated into fibers but were placed in sealed containers and set aside at room temperature (about 70° F.). The $C_{60}$ consistencies of the compounds were measured at different times and are shown in Table 1.

FIG. 1 is a graph of the $C_{60}$ consistencies shown in Table 1 wherein curve A represents the consistency rise of the compound made according to Formula A and curve B represents the compound according to Formula B and so on.

The compound corresponding to Formula A represents a general sheet molding compound known in the prior art; it contains no viscosity increasing chemicals and thus remains sticky. Note that curve A shows no rise in consistency over a long period. Curve B corresponds to Formula B and represents the typical prior art compound containing a delayed viscosity increasing chemical. Note the long period, i.e., 4 to 6 days, needed to reach maturation. Curve C is the same prior art compound with additional delayed viscosity increasing chemical (Formula C); while maturation has been speeded up, the consistency continues to rise so that the compound becomes too stiff to mold in the period of a few days.

Curve D (Formula D) incorporates a method of the present invention and shows that the addition of an aluminum salt of an organic acid (aluminum octoate) gives quick maturation with a stable long term consistency. Curve E (Formula E) shows another method of this invention, i.e., the same quantity of aluminum salt plus a hydroxyl containing agent.

This example clearly demonstrates the problem of controlling the rise in viscosity of an uncured polyester compound existing in the prior art and the uniqueness of this invention in relation thereto.

TABLE 1.—$C_{60}$ CONSISTENCIES OF THE COMPOUNDS OVER A PERIOD OF 21 DAYS

| Curve | Days 1 | 2 | 5 | 6 | 8 | 13 | 15 | 17 | 21 | Reference |
|---|---|---|---|---|---|---|---|---|---|---|
| Compound: | | | | | | | | | | |
| A | 0 | 0 | 0 | 0 | 0 | 0 | 0 | 0 | 0 | A-307-120/A539-42A. |
| B | 72 | 84 | | 98 | 117 | 120 | 128 | | 98 | A-307-120/A539-42A. |
| C | 571 | 1,438 | 2,830 | | 5,365 | | | | | A-307-120/A501-13E. |
| D | 2,173 | | | 2,187 | | 1,992 | | 1,953 | 1,923 | A-307-120/A598-71-16. |
| E | 1,043 | | | 1,073 | | 1,020 | 1,010 | | 1,042 | A-307-120/A598-71-18. |

| Ingredients | Formula A | Formula B | Formula C | Formula D | Formula E |
|---|---|---|---|---|---|
| Polyester resin (Vibrin® 170) [1], phr | 80.00 | 80.00 | 80.00 | 80.00 | 80.00 |
| Thermoplastic resinous modifier [2], phr | 20.00 | 20.00 | 20.00 | 20.00 | 20.00 |
| Inhibitor (benzoquinone), p.p.m. | 350 | 350 | 350 | 350 | 350 |
| Catalyst (Lubersol® PDO) [3], phr | 3.00 | 3.00 | 3.00 | 3.00 | 3.00 |
| Lubricant (zinc stearate), phr | 5.00 | 5.00 | 5.00 | 5.00 | 5.00 |
| Filler (Atomite®) [4], phr | 100.00 | 100.00 | 100.00 | 100.00 | 100.00 |
| Magnesium oxide (mole Mg/COOH equivalent) | | 0.60 | 1.00 | | |
| Aluminum octoate (mole Al/COOH equivalent) | | | | 0.50 | 0.50 |
| Water (mole water/mole Al) | | | | | 1.50 |

[1] 30% styrenated polyester reisn, W. R. Grace Co.
[2] A solution of high impact polystyrene in styrene monomer.
[3] t-Butyl peroctaote, Wallace & Tiernan, Inc.
[4] Calcium carbonate, Thompson & Weinman and Co.

EXAMPLE 2

Figure 2:
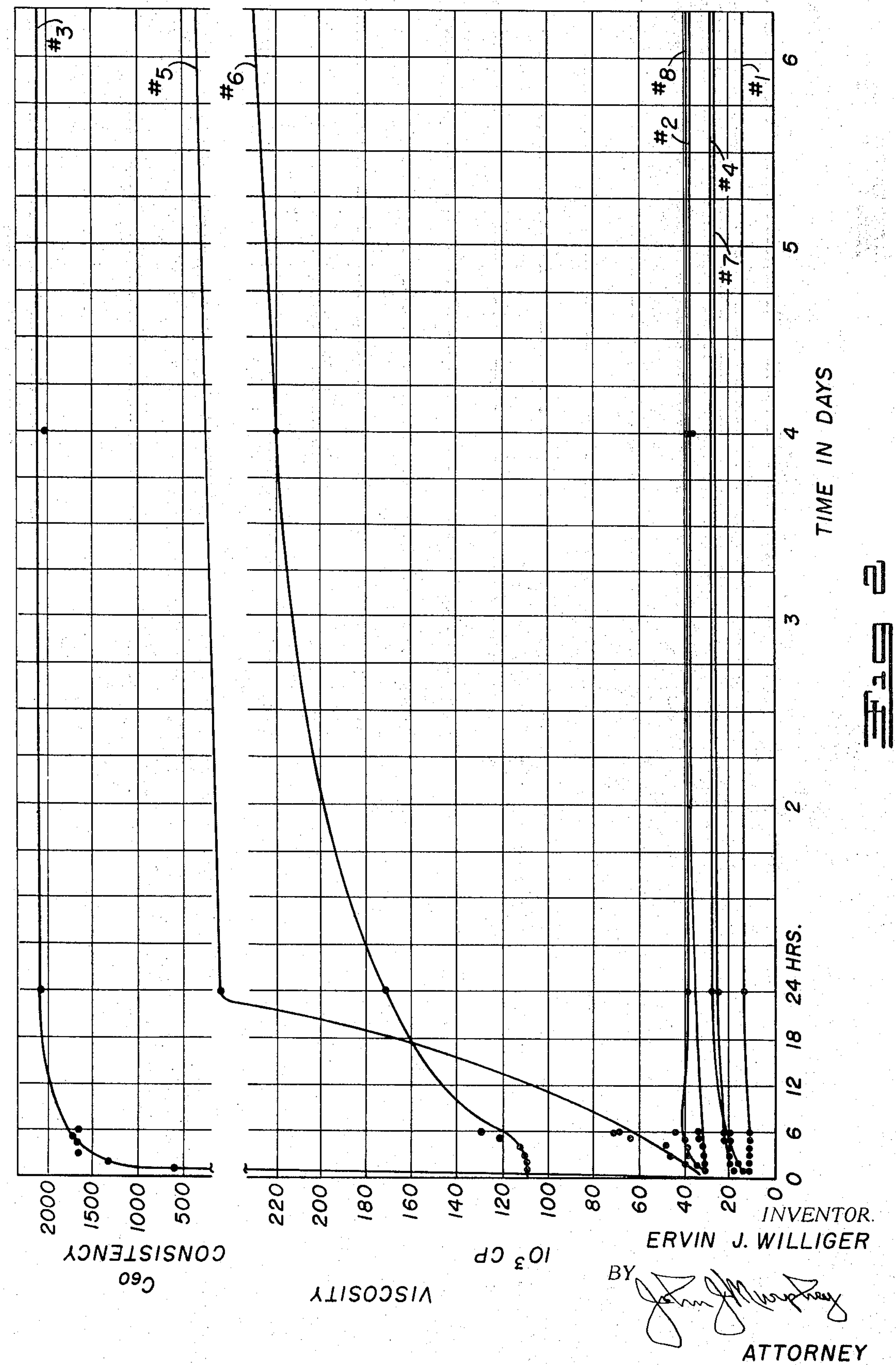
FIG. 2 is a graph of viscosity vs. time for resins containing several aluminum salts of organic acids taught by this invention.

An uncured polyester resin compound, made according to Formula A in Example 1, was divided into 8 portions. To each portion was added an aluminum salt of a different organic acid listed as 1 to 8 below. The consistencies of the portions were measured over a period of days and are listed below in Table 2. FIG. 2 is a graph of the $C_{60}$ consistencies shown in Table 2; the number of each curve corresponds to the number of the portion.

This example shows the breadth of organic acids from which aluminum may be reacted to form controlled viscosity rising chemicals and the preferred aluminum compounds viz aluminum octoate and aluminum laureate.

TABLE 2.—VISCOSITIES [1] OF THE COMPOUNDS OVER A PERIOD OF 35 DAYS

| Curve | Aluminum compound [2] | Hours 1 | 2 | 3 | 4 | 5 | 6 | 24 | Days 4 | 8 | 12 | 13 | 16 | 26 | 34 | 35 | Reference |
|---|---|---|---|---|---|---|---|---|---|---|---|---|---|---|---|---|---|
| Portion: | | | | | | | | | | | | | | | | | |
| 1 | Caproate | 12 | 12 | 12 | 12 | 12 | 12 | 14 | | | | | 14 | | | | A-648-120-2, A-648-10. |
| 2 | Benzoate | 32 | 33 | 33 | 33 | 34 | 34 | | 38 | | | 2,137 | | 36 | | | A-648-111-1, A-668-8. |
| 3 | Octoate | 573 | 1,333 | 1,673 | 1,691 | 1,704 | 1,690 | 2,073 | 2,073 | | | | | | | | A-648-87-4, A-307-117. |
| 4 | Pivalate | 14 | 17 | 20 | 20 | 20 | 20 | 28 | | | | | 30 | | | | A-648-120-1, A-668-10. |
| 5 | Laureate | 33 | 40 | 46 | 50 | 64 | 72 | 132 | | | | | 473 | | | 465 | A-648-102-2, A-668-3. |
| 6 | Naphthenate. | 110 | 110 | 112 | 114 | 122 | 130 | 172 | | 220 | 240 | | | | 280 | | A-648-103-3, A-307-184. |
| 7 | Palmitate | 18 | 20 | 20 | 20 | 22 | 22 | 26 | | | | 28 | | | | 40 | A-648-102-1, A-668-3. |
| 8 | Stearate | 31 | 35 | 39 | 39 | 40 | 44 | 39 | 39 | | | | | | | | A-648-79-2, A-307-151. |

[1] All underlined values are $C_{60}$ consistencies, all other figures are centipoises ×1,000.
[2] All aluminum compounds used in the amount of 0.5 mole Al/COOH eq.

EXAMPLE 3

Figure 3:
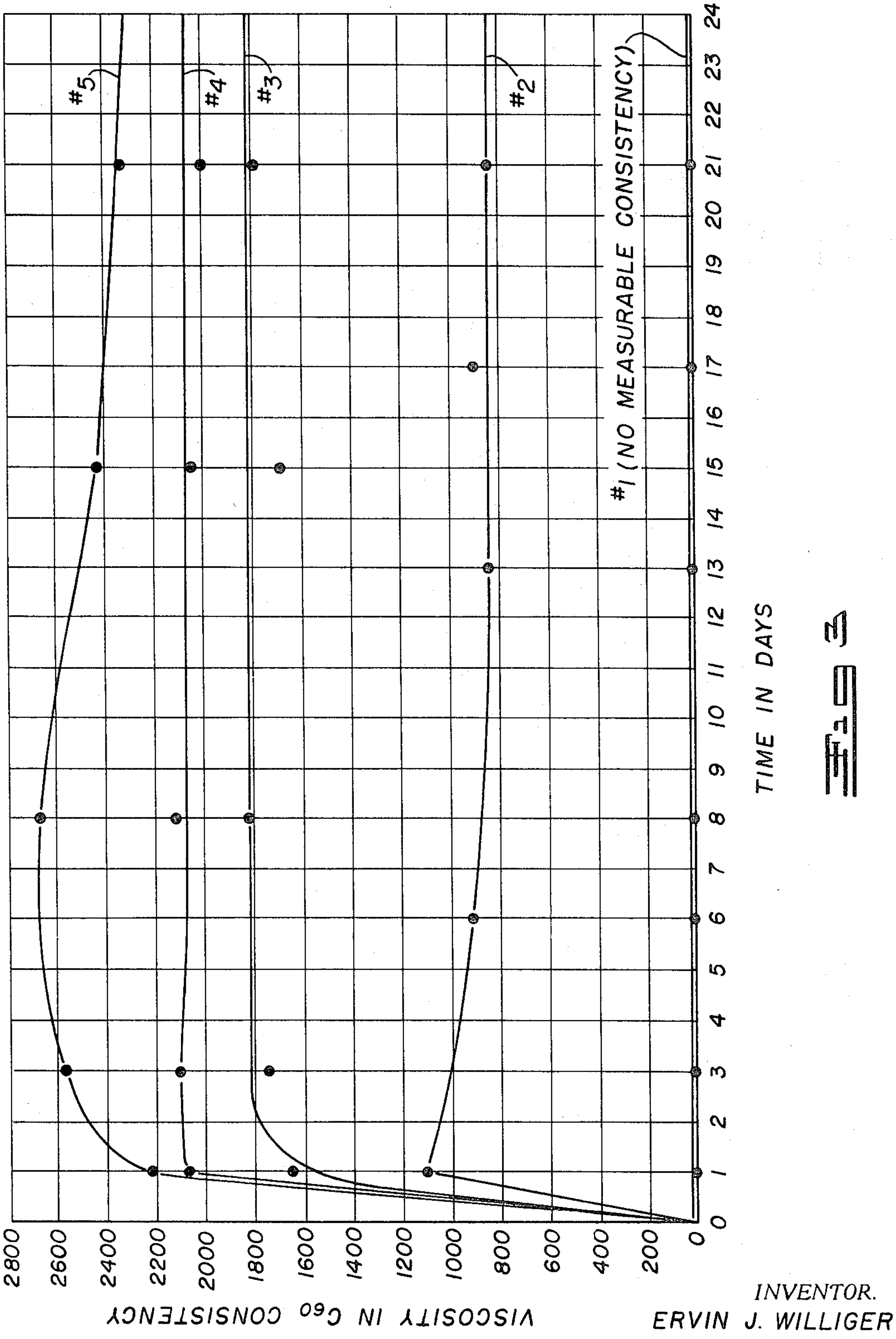
FIG. 3 is a graph of viscosity vs. time for resins containing various amounts of an aluminum salt of an organic acid taught by this invention.

An uncured polyester resin compound, made according to Formula A in Example 1, was divided in five portions. To each portion was added aluminum octoate in different amounts. The consistencies of the portions were measured over a period of days and are listed below in Table 3. FIG. 3 is a graph of the $C_{60}$ consistencies shown in Table 3; the number of each curve corresponds to the number of the portion.

This example shows the efficacy of the preferred aluminum compound, aluminum octoate, in producing a controllable rise in viscosity of an uncured polyester resin.

TABLE 3.—$C_{60}$ CONSISTENCIES OF THE COMPOUNDS OVER A PERIOD OF 21 DAYS

| Curve | Amount of aluminum octoate | Days 1 | 3 | 6 | 8 | 13 | 15 | 17 | 21 | Reference |
|---|---|---|---|---|---|---|---|---|---|---|
| Portion: | | | | | | | | | | |
| 1 | 0.1 mole Al/COOH equivalents | 78,000 | 44,000 | 38,000 | | 38,000 | | 34,000 | 30,000 | A-307-120/A-598-71-10. |
| 2 | 0.2 mole Al/COOH equivalents | 1,117 | | 916 | | 850 | | 910 | 850 | A-307-120/A-598-71-13. |
| 3 | 0.5 mole Al/COOH equivalents | 1,660 | 1,752 | | 1,823 | | 1,700 | | 1,794 | A-307-146/A-648-34-7. |
| 4 | 0.6 mole Al/COOH equivalents | 2,073 | 2,113 | | 2,123 | | 2,050 | | 2,000 | A-307-146/A-648-34-11. |
| 5 | 0.7 mole Al/COOH equivalents | 2,227 | 2,573 | | 2,673 | | 2,430 | | 2,340 | A-307-146/A-648-34-12. |

NOTE: Portion 1 consistencies are all vicsosities in centipoise, all other portions are in $C_{60}$ consistencies.

EXAMPLE 4

Figure 4:
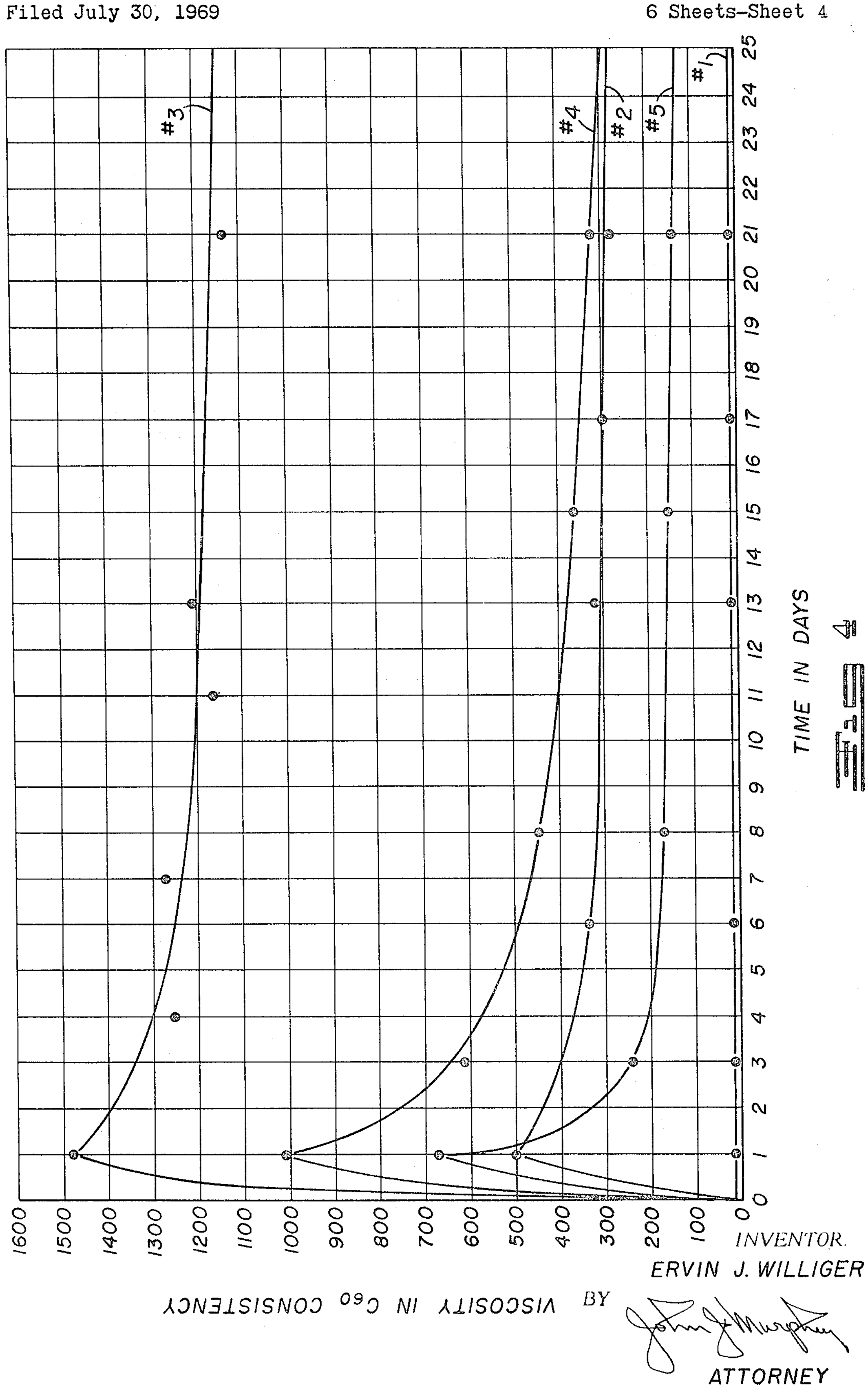
FIG. 4 is a graph of viscosity vs. time for resins containing various amounts of an aluminum salt of an organic acid and a constant amount of a hydroxyl containing agent according to the teachings of this invention.

To compounds identical to those of Example 3 were added water in the amount of 1.5 moles water per mole aluminum. The consistencies of the compounds were measured over a period of days and are listed below in Table 4. FIG. 4 is a graph of the $C_{60}$ consistencies shown in Table 4; the number of each curve corresponds to the number of the portion.

This example shows the affect that a hydroxyl containing agent has upon the action of the aluminum salt of an organic acid and the distinctiveness of this method.

TABLE 4.—$C_{60}$ CONSISTENCIES OF THE COMPOUNDS OVER A PERIOD OF 21 DAYS

| Curve | Amount of aluminum octoate | Amount of water | Days 1 | 3 | 4 | 6 | 7 | 8 | 11 | 13 | 15 | 17 | 21 | Reference |
|---|---|---|---|---|---|---|---|---|---|---|---|---|---|---|
| Portion: | | | | | | | | | | | | | | |
| 1 | 0.1 | 1.5 | 30,000 | 26,000 | | 28,000 | | | | 31,000 | | 28,000 | 30,000 | A-307-120, A-598-71-12. |
| 2 | 0.2 | 1.5 | 501 | | | 339 | | | | 321 | | 296 | 273 | A-307-120, A-598-71-15. |
| 3 | 0.5 | 1.5 | 1,480 | | 1,255 | | 1,273 | | 1,166 | 1,202 | | | 1,138 | A-307-145, A-648-57-2. |
| 4 | 0.6 | 1.5 | 1,009 | 615 | | | | 445 | | | 362 | | 325 | A-307-146, A-648-34-3. |
| 5 | 0.7 | 1.5 | 607 | 243 | | | | 172 | | | 154 | | 143 | A-307-146, A-648-34-6. |

NOTE: Portion 1 consistencies are all viscosities in centipoises, all other portions are in $C_{60}$ consistencies. Amounts of aluminum octoate are shown in mole Al/COOH eq. Amounts of water are shown in mole $H_2O$/mole Al.

EXAMPLE 5

Figure 5:
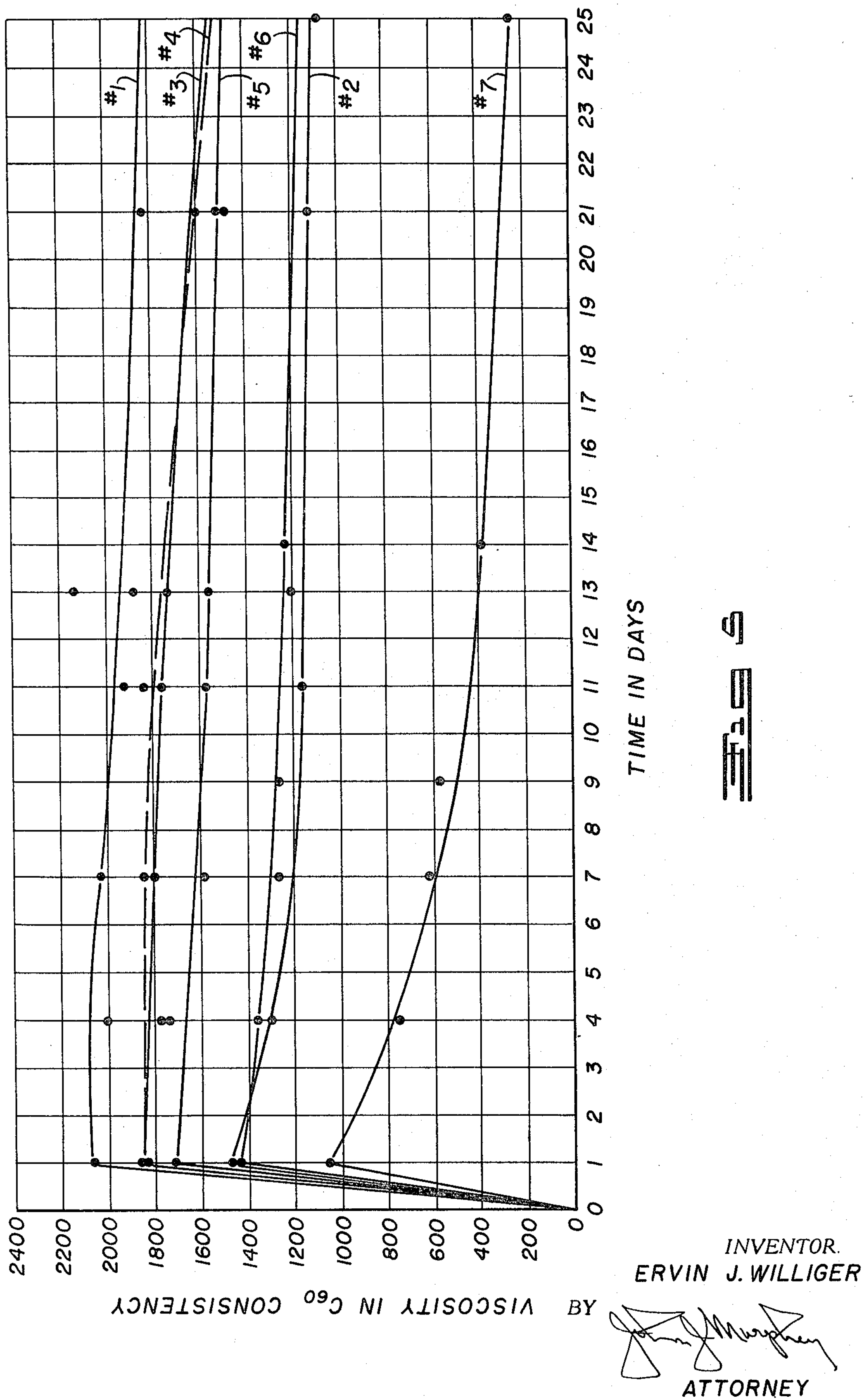
FIG. 5 is a graph of viscosity vs. time for resins containing an aluminum salt of an organic acid and various hydroxyl containing agents according to the teachings of this invention.

An uncured polyester resin compound, made according to Formula D in Example 1, was divided into seven portions. To each portion, except for the first portion, was added a different hydroxyl containing agent in the amount of 1.5 moles hydroxyl containing agent per mole aluminum. The consistencies of the portion were measured over a period of days and are listed below in Table 5. FIG. 5 is a graph of the $C_{60}$ consistencies shown in Table 5; the number of each curve corresponds to the number of the portion.

This example shows the breadth of hydroxyl containing agents which may be used in this invention.

This example shows that polyester resins having an acid number of zero do not respond to this invention.

TABLE 7.—VISCOSITIES OF THE COMPOUNDS OVER A PERIOD OF 29 DAYS

| Time | A, cps.[1] | B, cps.[1] | Reference |
|---|---|---|---|
| 1 hour | 27,000 | 28,000 | A-648-109/A-668-7. |
| 2 hours | 28,000 | 28,000 | A-648-109/A-668-7. |
| 3 hours | 30,000 | 29,000 | A-648-109/A-668-7. |
| 4 hours | 32,000 | 28,000 | A-648-109/A-668-7. |
| 5 hours | 33,000 | 28,000 | A-648-109/A-668-7. |
| 6 hours | 34,900 | 28,000 | A-648-109/A-668-7. |
| 3 days | 38,000 | 33,000 | A-648-109/A-668-7. |
| 7 days | 50,000 | 34,000 | A-648-109/A-668-7. |
| 29 days | 80,000 | 26,000 | A-648-109/A-668-7. |

TABLE 5.—$C_{60}$ CONSISTENCIES OF THE COMPOUNDS OVER A PERIOD OF 25 DAYS

| Curve | Hydroxyl containing agent | Days 1 | 4 | 7 | 9 | 11 | 13 | 14 | 21 | 25 | Reference |
|---|---|---|---|---|---|---|---|---|---|---|---|
| Portion: | | | | | | | | | | | |
| 1 | None | 2,073 | 2,013 | 2,028 | | 1,923 | 2,137 | | 1,826 | | A-648-57-1, A-307-149. |
| 2 | Water | 1,480 | 1,255 | 1,273 | | 1,166 | 1,202 | | 1,138 | | A-648-57-2, A-307-149. |
| 3 | Methanol | 1,850 | 1,773 | 1,796 | | 1,773 | 1,883 | | 1,481 | | A-648-57-14, A-307-149. |
| 4 | Ethanol | 1,853 | 1,773 | 1,813 | | 1,813 | 1,747 | | 1,509 | | A-648-57-11, A-307-149. |
| 5 | Isopropanol | 1,723 | 1,755 | 1,587 | | 1,573 | 1,565 | | 1,497 | | A-648-57-3, A-307-149. |
| 6 | Ethylene glycol | 1,442 | 1,364 | 1,261 | 1,258 | | | 1,219 | | 1,095 | A-648-67-3, A-307-150. |
| 7 | Dipropylene glycol | 1,063 | 758 | 616 | 573 | | | 386 | | 250 | A-648-67-5, A-307-150. |

EXAMPLE 6

Figure 6:
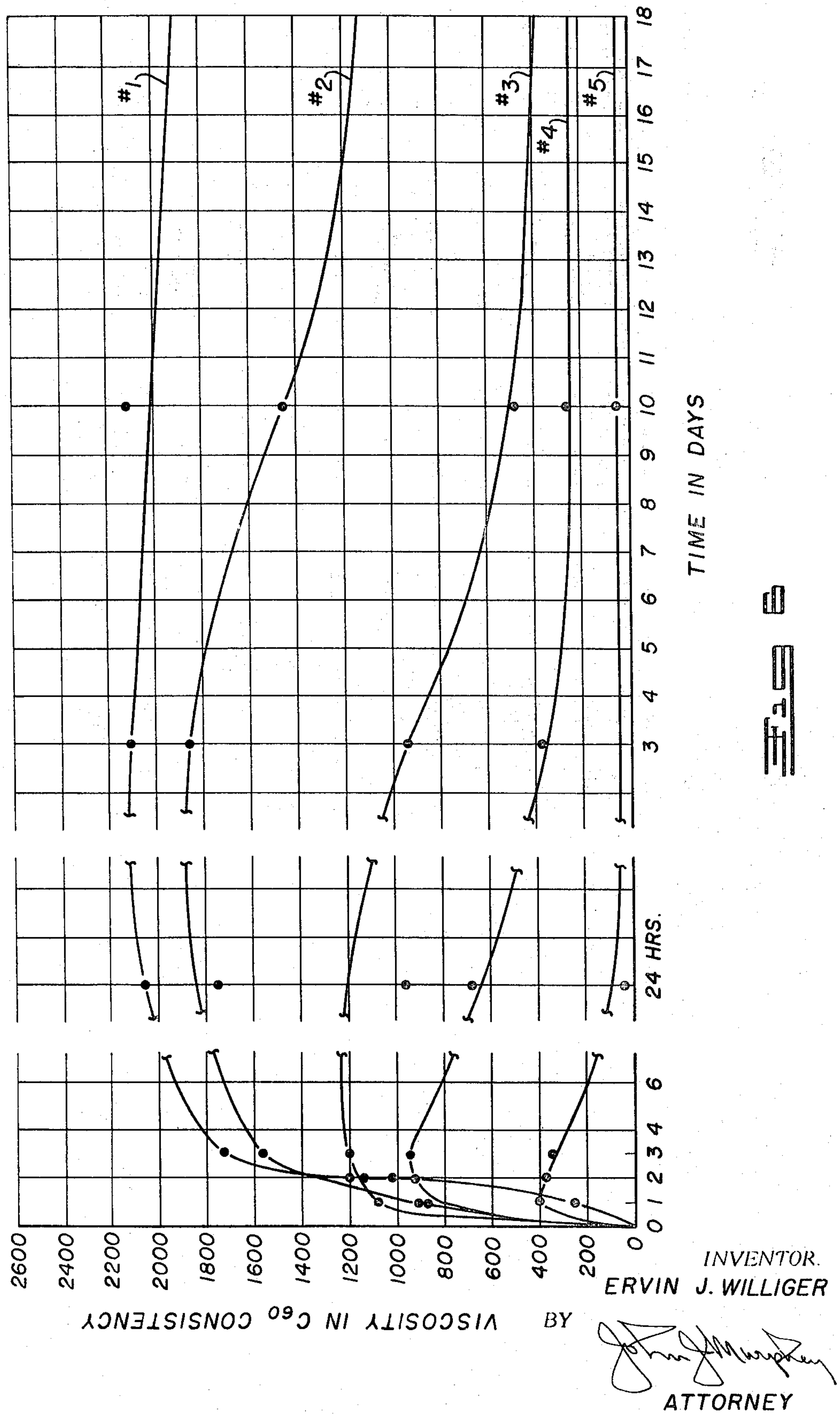
FIG. 6 is a graph of viscosity vs. time for resins containing an aluminum salt of an organic acid and various amounts of a hydroxyl containing agent according to the teachings of this invention.

An uncured polyester resin compound, made according to Formula D in Example 1, was divided into five portions. To each portion, except the first portion, was added water in different amounts. The consistencies of the portions were measured over a period of hours and days and are listed below in Table 6. FIG. 6 is a graph of the $C_{60}$ consistencies shown in Table 6; the number of each curve corresponds to the number of the portion.

This example demonstrates the effect different amounts of hydroxyl containing agents have on the controllability of the viscosity rise in the polyester resin compound. Moreover, this example demonstrates the effect hydroxyl containing agents have on reducing the time required to initiate the viscosity rise.

TABLE 6.—$C_{60}$ CONSISTENCIES OF THE COMPOUNDS OVER A PERIOD OF 10 DAYS

| Curve | Amount water added | Hours 1 | 2 | 3 | 24 | Days 3 | 10 | Reference |
|---|---|---|---|---|---|---|---|---|
| Portion: | | | | | | | | |
| 1 | None | 243 | 1,020 | 1,735 | 2,048 | 2,106 | 2,010 | A-648-123-1, A-668-11. |
| 2 | 0.75 mole $H_2O$/mole Al | 920 | 1,202 | 1,573 | 1,762 | 1,855 | 1,454 | A-648-123-2, A-668-11. |
| 3 | 1.50 mole $H_2O$/mole Al | 1,088 | 1,148 | 1,202 | 962 | 952 | 482 | A-648-123-3, A-668-11. |
| 4 | 3.00 mole $H_2O$/mole Al | 883 | 929 | 943 | 686 | 382 | 266 | A-648-123-4, A-668-11. |
| 5 | 6.00 mole $H_2O$/mole Al | 401 | 388 | 365 | 35 | 40 | 50 | A-648-132-5, A-668-11. |

EXAMPLE 7

Two uncured polyester resin compounds were made according to the formulas below; the resin had an acid number of 0. The compounds were set aside and their viscosities measured over a period of hours and days; these values are listed in Table 7.

| Ingredients | Formula A | Formula B |
|---|---|---|
| Polyester resin (Derekane® 114),[2] phr | 100.00 | 100.00 |
| Inhibitor (benzoquinone), p.p.m | 350 | 350 |
| Catalyst (Lupersol® PDO), phr | 3.00 | 3.00 |
| Lubricant (zinc stearate), phr | 5.00 | 5.00 |
| Filler (Atomite®), phr | 100.00 | 100.00 |
| Aluminum octoate, phr | 5.00 | 5.00 |
| Water, phr | | 0.50 |

[1] All viscosities measured on a Brookfield viscometer, No. 7 spindle, 20 r.p.m.

[2] Acid Number=0; Dow Chemical Co.

EXAMPLE 8

An uncured polyester resin compound, made according to Formula A in Example 1, was divided into thirteen portions. To each portion was added a metal salt of an organic acid, the metal being other than aluminum. The consistencies of the portions were measured over a period of days and are listed below in Table 8.

This example shows the success of gallium salts of organic acid and the failure of all other metal salts or organic acids to produce the synergistic effect of this invention.

TABLE 8.—VISCOSITIES[1] OF THE COMPOUNDS OVER A PERIOD OF 21 DAYS

| Compound | Moles metal/COOH, equivalent | Days 0 | 1 | 2 | 4 | 7 | 11 | 13 | 14 | 19 | 21 | Reference |
|---|---|---|---|---|---|---|---|---|---|---|---|---|
| Barium octoate | 0.6 | 275 | 500 | | | 640 | | | 600 | | 600 | A-307-115, A-598-54. |
| Barium acetate | 0.6 | 13 | 30 | 32 | | | | 54 | | 72 | | A-307-110, A-598-48. |
| Calcium oleate | 0.5 | 62 | 65 | | | 65 | | | 67 | | 69 | A-668-62. |
| Calcium stearate | 0.5 | 70 | 84 | | | 100 | | | 113.6 | | 102 | A-668-62. |
| Calcium acetyl acetonate | 0.5 | 16 | 88 | | | 98 | | | | 120 | 104 | A-668-63. |
| Calcium octoate | 0.6 | 61 | 120 | | | 220 | | | 196 | | 220 | A-307-115, A-598-54. |
| Calcium acetate | 0.6 | 15 | 35 | 6 | | | | 60 | | 86 | | A-307-110, A-598-48. |
| Cobalt octoate | 0.6 | | 23 | | 29 | | 38 | | | | 40 | A-598-75. |
| Magnesium acetate | 0.6 | 15 | 66 | 68 | | | | 85 | | 90 | | A-307-110, A-598-48 |
| Zinc stearate | 0.5 | 160 | 242 | | | 365 | | | 469 | | 459 | A-668-62. |
| Zinc octoate | 0.4 | | 270 | | 470 | | 690 | | | | [2] 36 | A-598-75-4. |
| Gallium octoate[2] | 0.5 | | 68 | | | 153 | | | | 271 | 282 | A-704-8, A-668-22. |
| Indium octoate | 0.5 | | 90 | | | 120 | | | | 120 | 120 | A-704-8, A-668-17. |

[1] Brookfield viscosity at 25° C., No. 5 and No. 6 spindle, 2-5 r.p.m., all values are × 1,000 cps. unless otherwise noted.

[2] Measured as $C_{60}$ consistency.

What is claimed is:

1. A process of producing a controllable rise in viscosity of an uncured polyester resin compound, said compound comprising an unsaturated polyester resin which is the reaction product of an unsaturated polycarboxylic acid and a glycol and having an acid number greater than zero, at least one polymerizable unsaturated monomer containing a terminal >C=$CH_2$ group, a free radical generating catalyst, and a polymerization inhibitor, comprising the step of introducing into said polyester resin compound a metal salt of an organic acid, wherein the metal portion of said metal salt is selected from the group consisting of aluminum ions and gallium ions, and wherein said organic acid portion of said metal salt is selected from the group consisting of octoic acid radicals and lauric acid radicals and said metal salt is present in an amount greater than about 0.05 mole metal per carboxyl equivalent in said polyester resin.

2. A process of producing a controllable rise in viscosity of an uncured polyester resin compound, said compound comprising an unsaturated polyester resin which is the reaction product of an unsaturated polycarboxylic acid and a glycol and having an acid number greater than zero, at least one polymerizable unsaturated monomer containing a terminal >C=$CH_2$ group, a free radical generating catalyst, and a polymerization inhibitor, comprising the step of introducing into said polyester resin compound a metal salt of an organic acid wherein the metal portion of said metal salt is selected from the group consisting of aluminum ions and gallium ions, wherein said organic acid portion of said metal salt is selected from the group consisting of octoic acid radicals and lauric acid radicals and wherein said metal salt is present in an amount greater than about 0.05 mole metal per carboxyl equivalent in said polyester resin, and a hydroxyl containing agent, said agent containing hydroxyl groups attached to atoms selected from the group consisting of hydrogen and carbon and wherein said hydroxyl containing agent is present in an amount greater than about 0.01 mole agent per mole of metal in said metal salt.

3. A process of producing a controllable rise in viscosity of an uncured polyester resin compound, as described in claim 1, wherein said metal salt of an organic acid is selected from the group consisting of aluminum octoate, aluminum laureate, and gallium octoate.

4. A process of producing a controllable rise in viscosity of an uncured polyester resin compound, as described in claim 2, wherein said metal salt of an organic acid is selected from the group consisting of aluminum octoate, aluminum laureate, and gallium octoate.

5. A process of producing a controllable rise in viscosity of an uncured polyester compound, as described in claim 2, wherein said hydroxyl containing agent is water.

6. A process of producing a controllable rise in viscosity of an uncured polyester compound, as described in claim 2, wherein said metal salt of an organic acid is aluminum octoate and said hydroxyl containing agent is water.

7. A process of producing a controllable rise in viscosity of an uncured polyester compound, as described in claim 2, wherein said metal salt of an organic acid is aluminum laureate and said hydroxyl containing agent is water.

8. A process of producing a controllable rise in viscosity of an uncured polyester compound, as described in claim 2, wherein said metal salt of an organic acid is gallium octoate and said hydroxyl containing agent is water.

9. A composition comprising, in the unpolymerized state, a polyester resin compound comprising an unsaturated polyester resin which is the reaction product of an unsaturated polycarboxylic acid and a glycol and has an acid number greater than zero, at least one polymerizable unsaturated monomer containing a terminal >C=$CH_2$ group, a free radical generating catalyst, a polymerization inhibitor, and a metal salt of an organic acid wherein the metal portion of said metal salt is selected from the group consisting of aluminum ions and gallium ions, wherein said organic acid portion of said metal salt is selected from the group consisting of octoic acid radicals and lauric acid radicals, and wherein said metal salt is present in an amount greater than about 0.05 mole metal per carboxylic equivalent in said polyester resin.

10. A composition comprising, in the unpolymerized state, a polyester resin compound, as described in claim 9, wherein said polyester resin compound includes a hydroxyl containing agent, said agent containing hydroxyl groups attached to atoms selected from the group consisting of hydrogen and carbon and being present in an amount greater than about 0.01 mole hydroxyl containing agent per mole of metal in said metal salt.

11. A composition comprising, in the unpolymerized state, a polyester resin compound, as described in claim 9, wherein said metal salt of an organic acid is selected from the group consisting of aluminum octoate, aluminum laureate, and gallium octoate and said hydroxyl containing agent is water.

12. In preparing a molding compound comprising an unsaturated polyester resin which is the reaction product of an unsaturated polycarboxylic acid and a glycol and having an acid number greater than zero, at least one polymerizable unsaturated monomer containing a terminal >C=$CH_2$ group, a free radical generating catalyst, and a polymerization inhibitor, the improvement comprising introducing into said compound a metal salt of an organic acid wherein the metal portion of said metal salt is selected from the group consisting of aluminum ions and gallium ions, wherein said organic acid portion of said metal salt is selected from the group consisting of octoic acid radicals and lauric acid radicals, and wherein said metal salt is present in an amount greater than about 0.05 mole metal per carboxyl equivalent in said polyester resin, to produce a controllable rise in viscosity of said molding compound.

References Cited

UNITED STATES PATENTS

| | | | |
|---|---|---|---|
| 2,843,556 | 7/1958 | Moorman | 260—28.5 |
| 2,933,475 | 4/1960 | Hoover et al. | 260—63 |
| 3,055,869 | 9/1962 | Wilson et al. | 260—75 |
| 3,112,283 | 11/1963 | Hansen et al. | 260—17.4 |
| 3,124,550 | 3/1964 | Salgado et al. | 260—22 |
| 3,219,604 | 11/1965 | Fischer | 260—22 |
| 3,390,205 | 6/1968 | Schnell et al. | 260—863 |
| 3,396,128 | 8/1968 | Matumoto et al. | 260—22 |
| 3,450,729 | 6/1969 | Larkins et al. | 260—863 |

FOREIGN PATENTS

| | | |
|---|---|---|
| 1,137,551 | 10/1962 | Germany. |

DONALD E. CZAJA, Primary Examiner

R. W. GRIFFIN, Assistant Examiner

U.S. Cl. X.R.

161—170, 231; 260—23, 29.2, 33.4, 40, 75, 863

PO-1050
(5/69)

UNITED STATES PATENT OFFICE
CERTIFICATE OF CORRECTION

Patent No. 3,536,642 Dated October 27, 1970

Inventor(s) E. J. Williger

It is certified that error appears in the above-identified patent and that said Letters Patent are hereby corrected as shown below:

Column 1, line 21, the phrase "another comprises" should read -- another method comprises --; line 44, the word "acceptaed" should read -- accepted --. Column 2, line 41, the phrase "magnesium oide" should read -- magnesium oxide --; Col. 4, line 53, the phrase "parachloro benzoyl peroxide" should read -- parachloro benzoyl peroxide) --. Column 7, lines 36-37, the phrase "(consistency level" should read -- (consistency) level --. Column 8, line 7, the phrase "increase percent compound" should read -- increase present compound". Column 9, footnote 3 in Table 1, the phrase "Wallace & Tiernan, Inc." should read -- Wallace & Thierman, Inc. --; Table 2, Portion 2, the number "2,137" should be deleted; Table 2, Portion 3, the number "2,137" should appear under heading "13"; Table 2, Reference, the phrase "A-648-120-2, A-648-10" should read -- A-648-120-2, A-668-10 --. Table 6, Reference, "A-648-132-5" should read -- A-648-123-5 --. Table 7, the phrase "6 hours ------ 34,900" should read -- 6 hours ------ 34,000 --. Table 8, Calcium acetate, the number "6" under heading "2" should read -- 46 --.

SIGNED AND
SEALED
MAR 2 1971

(SEAL)
Attest:

Edward M. Fletcher, Jr.
Attesting Officer

WILLIAM E. SCHUYLER, JR.
Commissioner of Patents